(12) United States Patent
Nagakura et al.

(10) Patent No.: US 8,676,477 B2
(45) Date of Patent: Mar. 18, 2014

(54) ROTATIONAL FLUCTUATION MALFUNCTION DETECTION DEVICE AND ROTATIONAL FLUCTUATION MALFUNCTION DETECTION METHOD FOR INTERNAL COMBUSTION ENGINE

(75) Inventors: Keisuke Nagakura, Toyota (JP); Yusuke Fujitsu, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 486 days.

(21) Appl. No.: 13/049,210

(22) Filed: Mar. 16, 2011

(65) Prior Publication Data
US 2011/0231084 A1    Sep. 22, 2011

(30) Foreign Application Priority Data
Mar. 17, 2010   (JP) .................................. 2010-061096

(51) Int. Cl.
*F02D 41/22* (2006.01)
*F02D 45/00* (2006.01)
*F02D 28/00* (2006.01)

(52) U.S. Cl.
USPC ....................................................... 701/111

(58) Field of Classification Search
USPC ........ 701/111, 101, 102, 112, 110, 69, 93, 54
See application file for complete search history.

(56) References Cited

U.S. PATENT DOCUMENTS

| 3,421,367 | A | * | 1/1969 | Mears et al. ................ 73/114.23 |
| 5,033,328 | A | * | 7/1991 | Shimanaka ....................... 701/54 |
| 7,351,182 | B2 | * | 4/2008 | Kobayashi ......................... 477/5 |

FOREIGN PATENT DOCUMENTS

| JP | 2000257498 A | 9/2000 |
| JP | 2004346807 A | 12/2004 |
| JP | 2008151003 A | 7/2008 |

* cited by examiner

*Primary Examiner* — Hieu T Vo
(74) *Attorney, Agent, or Firm* — Gifford, Krass, Sprinkle, Anderson & Citkowski, P.C.

(57) ABSTRACT

A rotational fluctuation malfunction detection device for an internal combustion engine determines that fluctuations in output shaft rotational speed are "normal" when a rotational fluctuation value, obtained in a "disturbance fluctuation state" is below threshold L1. If rotational fluctuation value obtained in "disturbance fluctuation state" equals or exceeds L2, the rotational fluctuation malfunction detection device determines that the rotational fluctuation value is "abnormal." However, when the rotational fluctuation value obtained in "disturbance fluctuation state" is equal to L1 or between L1 and L2, the rotational fluctuation malfunction detection device determines that the rotational fluctuation value is "normal" if the rotational fluctuation value obtained in the "non-disturbance state" is below L3, and the rotational fluctuation value is "abnormal" if the rotational fluctuation value obtained in the "non-disturbance state" equals or exceeds L3.

13 Claims, 7 Drawing Sheets

ROTATIONAL FLUCTUATION MALFUNCTION DETECTION DEVICE AND ROTATIONAL FLUCTUATION MALFUNCTION DETECTION METHOD FOR INTERNAL COMBUSTION ENGINE

CROSS REFERENCE TO RELATED APPLICATION

This application claims priority to Japanese Patent Application No. 2010-061096 filed on Mar. 17, 2010, which is incorporated herein by reference in its entirety including the specification, drawings and abstract.

BACKGROUND OF THE INVENTION

1. Field of the Invention

The present invention relates to a rotational fluctuation malfunction detection device for an internal combustion engine and to a rotational fluctuation malfunction detection method for the internal combustion engine.

2. Description of the Related Art

In general, combustion strokes (expansion strokes) occur periodically when an internal engine is running. For example, in a 4 cylinder 4 cycle internal combustion engine the combustion stroke occurs at every 180° of a crank angle. Accordingly, the rotational speed of an output shaft (crankshaft) of the internal combustion engine generally fluctuates uniformly in a periodic manner in which the rotational speed increases during the combustion stroke and decreases outside of the combustion stroke. The fluctuation in rotational speed that occurs periodically with the combustion strokes is the normal behavior of the engine. Therefore, such fluctuations will be referred to as "normal fluctuations." The rotational speed of the output shaft of the internal combustion engine may simply be referred to as "output shaft rotational speed."

For various reasons, non-uniform fluctuations in the output shaft rotational speed sometimes occur that deviate excessively from the normal fluctuations. For example, in a multiple cylinder internal combustion engine, a fuel injection valve for one of the cylinders may characteristically inject a smaller amount of fuel than specified while the fuel injection valves for the other cylinders inject the specified amount of fuel. Accordingly, the deviant cylinder is called "lean imbalanced cylinder," and the other cylinders are called "normal cylinders." And, the above state is called "lean imbalanced state."

In the lean imbalanced state, the combustion energy in the lean imbalanced cylinder is smaller than that of a normal cylinder. In other words, the peak speed of the combustion stroke of the lean imbalanced cylinder may be below the peak speed of the combustion stroke in a normal cylinder. As a result, non-uniform rotational speed fluctuation may occur. If the lean imbalance is large (when the fuel injection amount of the lean imbalanced cylinder deviates significantly from the specific amount), the rotational speed fluctuation may become excessively non-uniform.

In addition, if a fuel injection valve in a particular cylinder injects more than the specified amount of fuel, non-uniform fluctuations in the output shaft rotational speed may also be induced that deviate excessively from the normal fluctuations. The above-described specific cylinder may be referred to as a "rich imbalanced cylinder," and the above-described state is called "rich imbalanced state." However, the extent of non-uniformity in the rich imbalanced state is generally not as excessive as that which occurs in the lean imbalanced state. The reason is that the difference in combustion energy between the imbalanced cylinder and the normal cylinder is less significant in the rich imbalanced state than in the lean imbalanced state. Conclusively, the excessive lean imbalanced state easily causes the excessively non-uniform rotational speed fluctuation.

The rotational speed fluctuation becomes excessively non-uniform if a malfunction occurs in a torsional damper interposed between the output shaft of the internal combustion engine and the input shaft of the transmission (automatic transmission) to prevent the pulsation of the torque transmitted to the transmission from the internal combustion engine. In addition, the rotational speed fluctuation may become excessively non-uniform if misfire occurs within one of the cylinders.

Accordingly, if the rotational speed fluctuation becomes excessively non-uniform for the reasons described above, countermeasures need to be taken. For this reason, it is necessary to detect a "malfunction" in the vehicle that causes the excessive non-uniform rotational speed fluctuation. For example, Japanese Patent Application Publication No. 2004-346807 (JP-A-2004-346807) describes a device that outputs signals indicating the determination of whether the degree in non-uniformity of rotational speed fluctuation is abnormal based on the value of the parameter (referred to as "fluctuation parameter" hereinafter) that indicates the degree of non-uniformity of the rotational speed fluctuation.

When the vehicle is in motion (and when the transmission of the vehicle is set into a driving range other than neutral), rotational speed fluctuation tends to occur due to disturbances from the driving wheels of the vehicle. This tendency increases when the vehicle travels over a rough road. Hereinafter, the above-mentioned state, in which the rotational speed fluctuates due to disturbances from the driving wheel while the internal combustion engine is running, is called "disturbance fluctuation state." When the vehicle is stopped (it does not matter whether the transmission is set into the driving range or neutral), the driving wheel does not move. In this case, the rotational speed fluctuation does not occur due to disturbances from the driving wheel of the vehicle. Hereinafter, the state, in which the rotational speed does not fluctuate due to disturbances from the driving wheel while the internal combustion engine is running, is called "non-disturbance fluctuation state."

In the disturbance fluctuation state, the rotational speed fluctuation becomes non-uniform due to disturbances from the driving wheel. Therefore, if the fluctuation parameter is obtained in the disturbance fluctuation state, the "malfunction" (malfunction of rotational speed fluctuation) that indicates the rotational speed fluctuation be excessively non-uniform is possibly detected even when the malfunction does not really occur in the vehicle system. For this reason, it is preferred that the fluctuation parameter is obtained in the non-disturbance fluctuation state (such as, preferably, idling state of the vehicle) in which the rotational speed fluctuation is not affected by the disturbances from the driving wheel.

However, recently developed vehicles are able to stop the operation of the internal combustion engine under prescribed conditions while the vehicle is stopped. Such an idle stop function can be equipped not only in the vehicles that are driven by an internal combustion engine alone but also in the vehicles that are driven by an internal combustion engine and an electric motor together (so-called hybrid vehicles).

Vehicles equipped with the idle stop function rarely reach the state in which the internal combustion engine is continuously operated while the vehicle is stopped (that is, non-disturbance fluctuation state). In other words, when the fluctuation parameter is obtained in the non-disturbance fluctuation state, as described above, the opportunity to determine whether an malfunction of rotational speed fluctuation is occurring is problematically rare.

SUMMARY OF THE INVENTION

The present invention is made in view of the above problems, and provides a rotational fluctuation malfunction detection device and a method of detecting rotational fluctuation malfunctions in an internal combustion engine mounted in the vehicle that stops the operation of the internal combustion engine under a predetermined condition while the vehicle is stopped. According to the present invention, a sufficient number of opportunities to determine the presence or absence of rotational speed fluctuation abnormality caused by vehicle system malfunction can be ensured, and the malfunction of the rotational speed fluctuation can be detected precisely.

According to one aspect of the present invention, a rotational fluctuation malfunction detection device for an internal combustion engine, that serves as a power source for a vehicle, is provided. The rotational fluctuation malfunction detection device includes, a parameter obtaining device, an automatic engine stop device, and a signal output device. Each of these devices is explained in the following paragraphs.

The parameter obtaining device obtains a value of a fluctuation parameter that indicates a degree of non-uniformity in the rotational speed fluctuation of the output shaft of the internal combustion engine. As the fluctuation parameter, there may be included, for example, a difference between cylinders in time required for the crank angle to advance from a first specific angle (top dead center/TDC for example) to a second specific angle (after top dead center/ATDC of 30° for example), a difference between a maximum and a minimum of a plurality of the highest or lowest values of the rotational speed measured per unit time of combustion cycles, a difference between cylinders in differential value (change amount per unit time) or equivalence or second differential value (change amount of change amount per unit time) or equivalence about a rotational speed at a specific crank angle (TDC for example) in relation to a time. The unit time of combustion cycle is a period of time necessary for each cylinder to complete its single combustion cycle. In the four-cycle engine, for example, it is a period of time needed for a crankshaft to turn an angle of 720°. The fluctuation parameter increases its value along with an increase of a degree of non-uniformity of the rotational speed fluctuation. Therefore, the fluctuation parameter increases its value as the degree of lean imbalanced state becomes larger (as an amount of fuel injection of the lean imbalanced cylinder becomes more insufficient).

The automatic engine stop device stops the internal combustion engine when an engine stop condition, including that the vehicle is stopped, is satisfied. That is, the device is used in the vehicles such as hybrid vehicles and vehicles equipped with the idle stop function.

The signal output device outputs a signal that indicates a determination result of whether the degree of non-uniformity of the rotational speed fluctuation is abnormal or not based on the fluctuation parameter value obtained in the operation of the internal combustion engine.

The rotational fluctuation malfunction detection device is characterized by the following. If the value of the fluctuation parameter obtained in the "disturbance fluctuation state" is below a first threshold value, the signal output device outputs a signal that indicates the determination result based on the value of the fluctuation parameter obtained in the "disturbance fluctuation state." On the other hand, if the value of the fluctuation parameter obtained in the "disturbance fluctuation state" equals or exceeds the first threshold value, the signal output device outputs a signal that indicates the determination results based on the value of the fluctuation parameter obtained in a "non-disturbance fluctuation state" instead of the "disturbance fluctuation state."

Another aspect of the present invention provides a method of detecting rotational fluctuation malfunctions in an internal combustion engine that serves as a power source for a vehicle, including:

obtaining the value of the fluctuation parameter that indicates the degree of non-uniformity of fluctuation in rotational speed of the output shaft of the internal combustion engine;

outputting a signal that indicates a determination result of whether the degree of non-uniformity of fluctuation of the rotational speed is abnormal based on the value of the fluctuation parameter obtained during a disturbance fluctuation state, in which disturbances from a driving wheel, to which driving torque of the output shaft of the internal combustion engine is transmitted, cause fluctuations in the rotational speed of the output shaft of the internal combustion engine, and a non-disturbance state, in which disturbances from the driving wheel do not cause fluctuations in the rotational speed of the output shaft, wherein the determination result is based on the value of the fluctuation parameter obtained during the disturbance fluctuation state if the value of the fluctuation parameter obtained in the disturbance fluctuation state is below a first threshold value, and the determination result is based on the value of the fluctuation parameter obtained in the non-disturbance state if the fluctuation parameter value obtained in the disturbance fluctuation state equals or exceeds the first threshold value.

The above-mentioned rotational fluctuation malfunction detection device and rotational fluctuation malfunction detection method for the internal combustion engine are made based on the following findings. The value of fluctuation parameter obtained in the "non-disturbance fluctuation state" precisely indicates the degree of non-uniformity of the rotational speed fluctuation caused by the malfunction of the vehicle system. On the other hand, the value of the fluctuation parameter obtained in the "disturbance fluctuation state" increases or decreases more easily, according to the disturbances from the driving wheel, than the value of the fluctuation parameter obtained in the "non-disturbance fluctuation state" (the value tends to increase in normal cases). That is, sometimes, the value of the fluctuation parameter obtained in the "disturbance fluctuation state" does not precisely indicate the degree of non-uniformity of the rotational speed fluctuation caused by the malfunction of the vehicle system.

However, in the case where the value of the fluctuation parameter obtained in the "disturbance fluctuation state" is sufficiently low, a precise determination can still be made to find out the absence of "malfunction of rotational speed fluctuation caused by malfunction of the vehicle system" even if the effect of the disturbances from the driving wheel (specifically, the fact that the fluctuation parameter is decreased by the disturbances from the driving wheel) is taken into consideration.

On the other hand, in the case where the value of the fluctuation parameter obtained in the "disturbance fluctuation state" is not sufficiently low, a precise determination is hardly made to find out the presence or absence of "malfunction of rotational speed fluctuation caused by malfunction of the vehicle system" based on the value of the fluctuation parameter, if the effect of the disturbances from the driving wheel (specifically, the fact that the fluctuation parameter increases or decreases due to the disturbances from the driving wheel)

is taken into consideration. Therefore, in this case, presence or absence of "malfunction of rotational speed fluctuation caused by malfunction of the vehicle system" can precisely be determined based on the value of the fluctuation parameter obtained in the "non-disturbance fluctuation state" instead of the "disturbance fluctuation state."

According to the above-described rotational fluctuation malfunction detection device and the rotational fluctuation malfunction detection method for the internal combustion engine, those vehicles in which the "non-disturbance fluctuation state" is not easily available, are given the opportunities to precisely determine the presence or absence of the "malfunction of the rotational speed fluctuation caused by malfunction of the vehicle system in the "disturbance fluctuation state"." That is, the opportunities to determine the presence or absence of the "malfunction of rotational speed fluctuation caused by malfunction of the vehicle system" can sufficiently be ensured, and the malfunction of the rotational speed fluctuation can precisely be detected.

Additional remarks are made about the "disturbance fluctuation state" and "non-disturbance fluctuation state." The "disturbance fluctuation state" indicates for example the following state, in which the internal combustion engine is running, the vehicle is moving, and the transmission interposed in the driveline between the output shaft of the internal combustion engine and the driving wheel is in a "torque transmission state" in which the driveline between the output shaft and the driving wheel is established.

On the other hand, the "non-disturbance fluctuation state" indicates the state in which the internal combustion engine is running and the vehicle is stopped. In this case, the transmission may either be in the "torque transmission state" or in the "no-torque transmission state" in which the driveline between the output shaft and the driving wheel is disengaged. If the operation stop conditions are satisfied while the vehicle is stopped, "non-disturbance fluctuation state" can be made available by prohibiting the operation stop of the internal combustion engine and continuing the operation of the internal combustion engine.

The "non-disturbance fluctuation state" indicates the state in which the internal combustion engine is running and in which the transmission is in the "no-torque transmission state." In this case, it is preferred that the vehicle is stopped. However, the vehicle may be moving only if the vehicle has a driveline in which rotational speed does not fluctuate due to disturbances from the driving wheel when the transmission is in the "no-torque transmission state."

Further specifically, the rotational fluctuation malfunction detection device and the rotational fluctuation malfunction detection method may be formed in the following way.

(1) When the value of the fluctuation parameter obtained in the disturbance fluctuation state is below the first threshold value, a signal that indicates the degree of non-uniformity of the fluctuation of the rotational speed be normal is output. This is based on the above-mentioned fact, that is, in the case where the value of the fluctuation parameter obtained in the "disturbance fluctuation state" is sufficiently low, a precise determination can still be made to find out the absence of "malfunction of rotational speed fluctuation caused by malfunction of the vehicle system" even when the effect of the disturbances from the driving wheel (specifically, the fact that the fluctuation parameter is decreased by the disturbances from the driving wheel) is taken into consideration.

(2) When the value of the fluctuation parameter obtained in the disturbance fluctuation state equals or exceeds the second threshold value which is larger than a first threshold value, a signal that indicates the degree of non-uniformity of the fluctuation of the rotational speed is abnormal is output. This is based on the above-described fact, that is, in the case where the value of the fluctuation parameter obtained in the "disturbance fluctuation state" is sufficiently large, a precise determination can be made to find out the presence of "malfunction of rotational speed fluctuation caused by malfunction of the vehicle system" even when the effect of the disturbances from the driving wheel (specifically, the fact that the fluctuation parameter is increased by the disturbances from the driving wheel) is taken into consideration.

(3) In the case where the value of the fluctuation parameter obtained in the disturbance fluctuation state equals or exceeds the first threshold value and below the second threshold value, a signal that indicates the degree of non-uniformity of the fluctuation of the rotational speed be normal is output when the value of the fluctuation parameter is below the third threshold value obtained in the non-disturbance fluctuation state, and a signal that indicates the degree of non-uniformity of the fluctuation of the rotational speed is abnormal is output when the value of the fluctuation parameter obtained in the non-disturbance state equals or exceeds the third threshold value. Accordingly, presence or absence of "malfunction of rotational speed fluctuation caused by malfunction of the vehicle system" is precisely determined based on the value of the fluctuation parameter obtained in the "non-disturbance fluctuation state" instead of the "disturbance fluctuation state" in the case where presence or absence of the "malfunction of rotational speed fluctuation caused by malfunction of the vehicle system" is hardly determined precisely based on the value of the fluctuation parameter obtained in the "disturbance fluctuation state."

The above-mentioned case (3) is one of the important features of the rotational fluctuation malfunction detection device and the rotational fluctuation malfunction detection method of the present invention. In other words, the rotational fluctuation malfunction detection device and the rotational fluctuation malfunction detection method of the present invention can be described in the following way. That is, a signal that indicates the determination result is output based on the value of the fluctuation parameter obtained in the "disturbance fluctuation state," and a signal that indicates the determination result is output based on the value of the fluctuation parameter obtained in the "non-disturbance fluctuation state." And it is possible that a signal that indicates the determination result is not output in the "disturbance fluctuation state" but output in the "non-disturbance fluctuation state" when the internal combustion engine is in the lean imbalanced state.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Hereinafter, with reference to the drawings, a description is made of a rotational fluctuation malfunction detection device (also referred to as "the detection device" hereinafter) of the internal combustion engine according to an embodiment of the present invention. As indicated in a thick solid line in FIG. 1, in the vehicle in which the detection device is used, the driving torque of an output shaft of an internal combustion engine E/G as a power source is transmitted through an automatic transmission A/T and a differential D/F to a driving wheel (right and left rear wheels in the example of FIG. 1).

The automatic transmission A/T, for example, includes a plurality of transmission ratios (D range) and a neutral (N range). The "D range" corresponds to the "torque transmission state" in which torque is transmitted through the driveline between the output shaft of the internal combustion engine E/G and the driving wheels is engaged, and the "N range" corresponds to the "non-torque transmission state" in which torque is not transmitted through the driveline between the output shaft of the internal combustion engine E/G and the driving wheels is disengaged.

A vehicle employing the detection device is used, is provided with an idle stop function to stop the operation of the internal combustion engine E/G under predetermined conditions while the vehicle is stopped. The vehicle may either be the one that is equipped with the internal combustion engine E/G alone as a power source or the one that is equipped with the internal combustion engine E/G and an electric motor M/G together as a power source (so-called hybrid vehicle).

Figure 2:
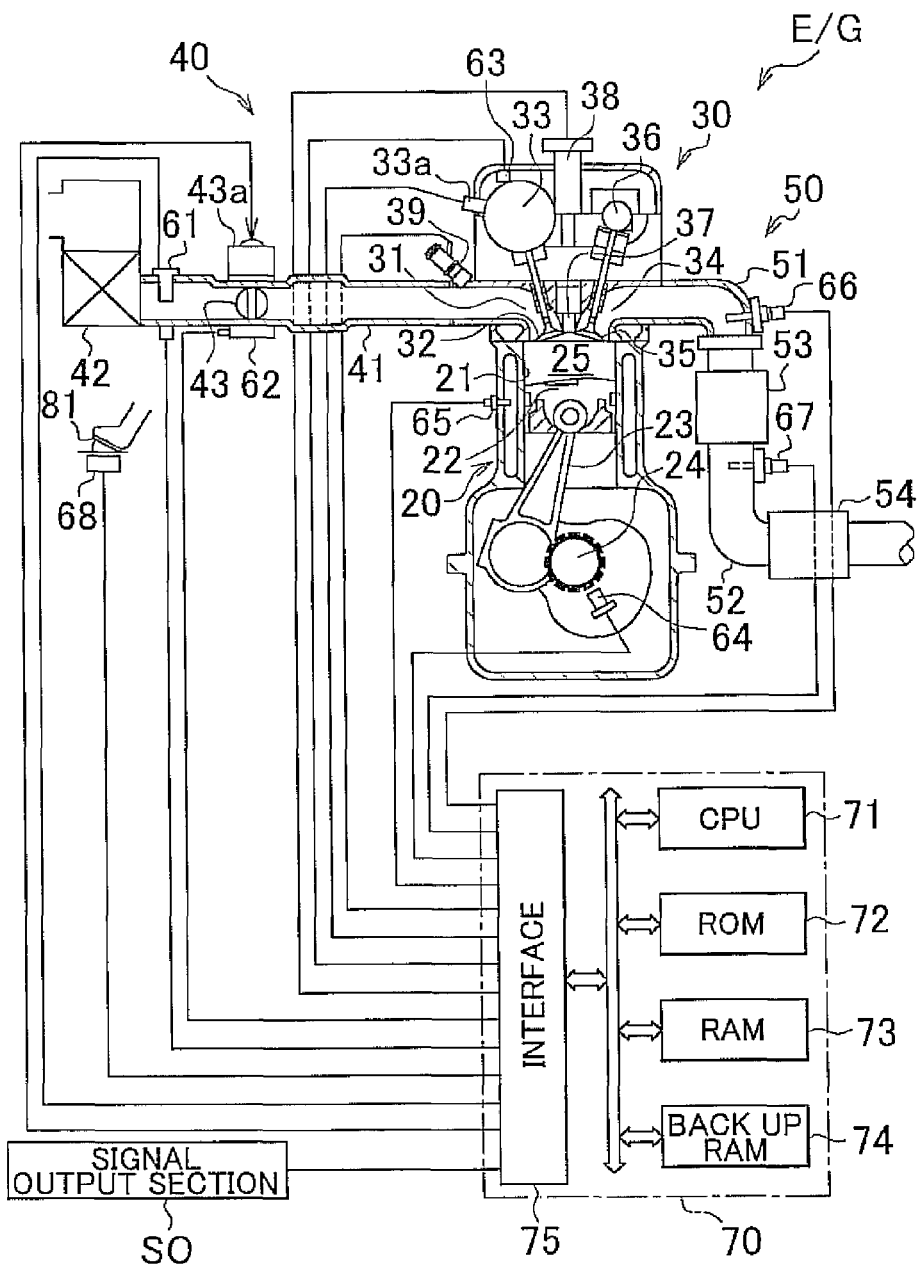
FIG. 2 shows a schematic configuration of a system that includes the rotational fluctuation malfunction detection device for an internal combustion engine according to an embodiment of the present invention.

FIG. 2 illustrates the schematic configuration of the system in which the detection device is used in a gasoline, 4-cycle, spark ignition, multi cylinder (4 cylinder), internal combustion engine E/G. Although FIG. 2 shows the cross section of only one cylinder, but the other cylinders are also constructed similarly.

The internal combustion engine E/G includes: a cylinder block section 20 including a cylinder block, a cylinder block lower case, and an oil pan; a cylinder head section 30 fixed on the cylinder block section 20; an inlet system 40 for supplying a gasoline mixture to the cylinder block section 20; and an exhaust system 50 for discharging exhaust gas from the cylinder block section 20 to the outside.

The cylinder block section 20 includes a cylinder 21, a piston 22, a connecting rod 23, and a crankshaft 24. The piston 22 reciprocates in the cylinder 21. The reciprocating movement of the piston 22 is transmitted through the connecting rod 23 to the crankshaft 24, thereby rotating the crankshaft 24. The head of the piston 22, the cylinder 21, and the cylinder head section 30 together form a combustion chamber 25.

The cylinder head section 30 includes: an inlet port 31 communicated with the combustion chamber 25; an inlet valve 32 that opens or closes the inlet port 31; a variable valve control mechanism 33 that includes an intake camshaft for operating the inlet valve 32 and that continuously changes the phase angle of the intake camshaft and a maximum lift amount of the inlet valve 32; an actuator 33a of the variable valve control mechanism 33; an exhaust port 34 that is communicated with the combustion chamber 25; an exhaust valve 35 that opens or closes the exhaust port 34; an exhaust camshaft 36 that operates the exhaust valve 35; a spark plug 37; an igniter 38 that includes an ignition coil for generating high voltage applied to the ignition plug 37; and a fuel injection valve 39 that sprays fuel at the inlet port 31 upstream of the inlet valve 32.

The inlet system 40 includes: an inlet pipe 41 that includes an intake manifold connected to the inlet port 31 of each cylinder; an air filter 42 disposed in an end portion of the inlet pipe 41; a throttle valve 43 that is disposed in the inlet valve 41 to adjust the inlet opening area; and an actuator 43a of the throttle valve 43. The inlet port 31 and the inlet pipe 41 form an inlet passage.

The exhaust system 50 includes: an exhaust manifold 51 connected to the exhaust port 34 of each cylinder; an exhaust pipe 52 connected to a collecting portion of the exhaust manifold 51; a first catalyst 53 (three-way catalyst) disposed in the exhaust pipe 52; a second catalyst 54 (three-way catalyst) disposed in the exhaust pipe 52 in a downstream side of the first catalyst 53. The exhaust port 34, the exhaust manifold 51, and the exhaust pipe 52 together form an exhaust passage.

The system includes a hot wire air flow meter 61, a throttle position sensor 62, a cam position sensor 63, a crank position sensor 64, a coolant temperature sensor 65, a upstream air-fuel ratio sensor 66, a downstream air-fuel ratio sensor 67, an accelerator operation amount sensor 68, a signal output section SO, and an electric control unit 70.

The air flow meter 61 outputs a signal that indicates the mass flow rate (intake air amount rate) Ga of air flowing through the inlet pipe 41. The throttle position sensor 62 detects the degree of an opening of the throttle valve 43 and outputs the signal that indicates the degree of throttle valve opening.

The cam position sensor 63 generates a signal that has one pulse at every 90° rotation of the intake camshaft (that is, at every 180° rotation of the crankshaft 24). The crank position sensor 64 outputs a narrow pulse signal at every 10° rotation of the crankshaft 24, and outputs a wide pulse signal at every 360° rotation of the crankshaft 24. These signals indicate the engine rotational speed NE. The coolant temperature sensor 65 detects the temperature of coolant in the internal combustion engine E/G, and outputs a signal that indicates the detected coolant temperature.

The upstream air-fuel ratio sensor 66 is disposed upstream of the first catalyst 53 in a collecting exhaust passage that is formed by collecting a plurality of exhaust passages extended from each cylinder. The exhaust gas that passes through the collecting exhaust passage is referred to as "mixed exhaust gas." The mixed exhaust gas is a mixture of the exhaust gases discharged from each cylinder. The upstream air-fuel sensor 66 is a so-called "limiting current type oxygen concentration sensor." The upstream air-fuel sensor 66 detects the air-fuel ratio of the mixed exhaust gas entering into the first catalyst 53, and outputs a signal that indicates the detected air-fuel ratio.

The downstream air-fuel ratio sensor 67 is disposed downstream of the first catalyst 53 in the collecting exhaust passage. The downstream air-fuel sensor 67 is a so-called "concentration cell type oxygen sensor." The downstream air-fuel sensor 67 detects the air-fuel ratio of the mixed exhaust gas discharged from the first catalyst 53, and outputs a signal that indicates the detected air-fuel ratio. The accelerator operation amount sensor 68 outputs a signal that indicates the operation amount of an accelerator pedal 81.

The electric control unit 70 is a microcomputer that is formed by connecting the following devices with each other through a bus: a CPU 71; a ROM 72 that stores programs executed by the CPU 71, tables (such as map and functions) and constants; a RAM 73 in which the CPU 71 stores data temporarily as necessary; a backup RAM 74 that stores data while the power is on and keeps the stored data even after the power is turned off; and an interface 75 that includes an AD converter.

The interface 75 is connected to the sensors 61 to 68, and supplies signals from the sensors 61 to 68 to the CPU 71 and outputs signals to the actuator 33a of the variable valve control mechanism 33, the igniter 38, the fuel injection valve 39, the throttle valve actuator 43a, and the signal output section SO, according to the instruction of the CPU 71.

As described later, the signal output section SO receives a signal, that indicates whether the lean imbalanced state is "normal" or "abnormal," from the electric control unit 70, and outputs the information to the outside.

Next, the feedback control of an air-fuel ratio of mixed exhaust gas is explained. The rotational fluctuation malfunction detection device controls the air-fuel ratio of the mixture supplied to the internal combustion engine so that the air-fuel ratio of the mixed exhausted gas discharged from the first catalyst 53 is greater than a target air-fuel ratio (=theoretical air-fuel ratio). Therefore, the air-fuel ratio of the mixed exhausted gas entering into the first catalyst 53 is also referred to as "air-fuel ratio" hereinafter.

Specifically, the detection device conducts a Proportional Integral Differential (PID) process on the deviation between the output value of the downstream air-fuel ratio sensor 67 disposed downstream of the first catalyst 53 and the target air-fuel ratio value equivalent to the theoretical air-fuel ratio, and then obtains a feedback correction value (sub-feedback correction amount). The output value of the upstream air-fuel ratio sensor 66 is corrected based on the sub-feedback correction amount, and then the air-fuel ratio is feedback-controlled by using the corrected value.

Next, the normal-abnormal determination of a lean imbalanced state is explained. If the air-fuel ratio of the mixed exhausted gas equals the theoretical air-fuel ratio after the above-described air-fuel ratio feedback control has been executed, then when the "lean imbalanced state" occurs, the air-fuel ratio of the "lean imbalanced cylinder" is leaner than the theoretical air-fuel ratio, and the air-fuel ratio of the "normal cylinder" is richer than the theoretical air-fuel ratio.

Accordingly, the exhaust gas expelled from the lean imbalanced cylinder contains a greater amount of nitrogen oxides (NOx), and the exhaust gas expelled from the normal cylinder contains a greater amount of unburned matters (such as HC and CO). The amount of the nitrogen oxides and unburned matters discharged from the cylinder increase as described above, because the leanness of the air-fuel ratio in the lean imbalanced cylinder and richness in the air-fuel ratio in the normal cylinder increase as the extent of lean imbalanced state becomes greater (i.e. as the amount of the fuel injected into the lean imbalanced cylinder increases).

In this specification, an excessive lean imbalanced state, in which nitrogen oxides and unburned matters are discharged beyond the specified value, is referred to as "malfunction", and the moderate lean imbalanced state, in which nitrogen oxides and unburned matters are not discharged beyond the specified value, or the state in which lean imbalanced state is not occurring may be referred to as "normal" (normality).

Countermeasures need to be taken when the "malfunction" state occurs with respect to the lean imbalanced state. For this reason, it is necessary to determine whether the "malfunction" state is occurring with respect to the lean imbalanced state. As described in the description of the related art, when the lean imbalanced state occurs, the engine rotational speed NE fluctuates non-uniformly. In addition, the degree of non-uniformity of the rotational speed fluctuation increases as the degree of the lean imbalanced state becomes larger.

The detection device employs a rotational fluctuation value to indicate a degree of non-uniformity of the fluctuation of the engine rotational speed NE, and determines whether the "malfunction" with respect to the lean imbalanced state occurs based on the above-described rotational fluctuation value. In the detection device, it is determined whether the "malfunction" of the lean imbalanced state is occurring based on the rotational fluctuation value, either in the "disturbance fluctuation state" in which the engine rotational speed NE fluctuates due to disturbances from the driving wheel, or in the "non-disturbance fluctuation state" in which engine rotational speed NE does not fluctuates due to disturbances from the driving wheel.

Figure 6:
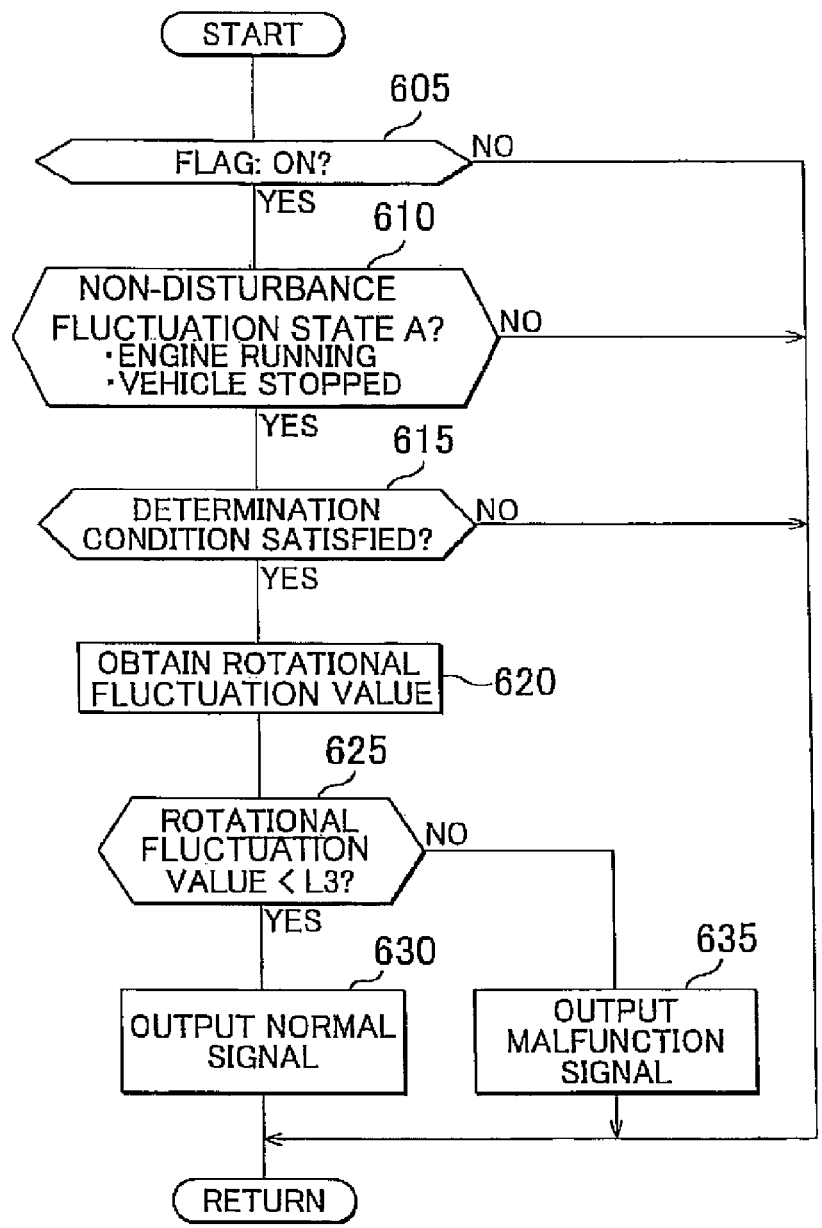
FIG. 6 is a flowchart showing the routine that is executed by a CPU shown in FIG. 2 in detecting malfunctions of rotational speed fluctuation based on the rotational fluctuation value obtained when the vehicle is in a non-disturbance fluctuation state.

The above-described determination processes of the detection device are described in detail with reference to routines shown in FIG. 3 and FIG. 6. The routine shown in FIG. 3 is related to the determination process in the "disturbance fluctuation state," and the routine shown in FIG. 6 is related to the determination process in the "non-disturbance fluctuation state."

Figure 1:
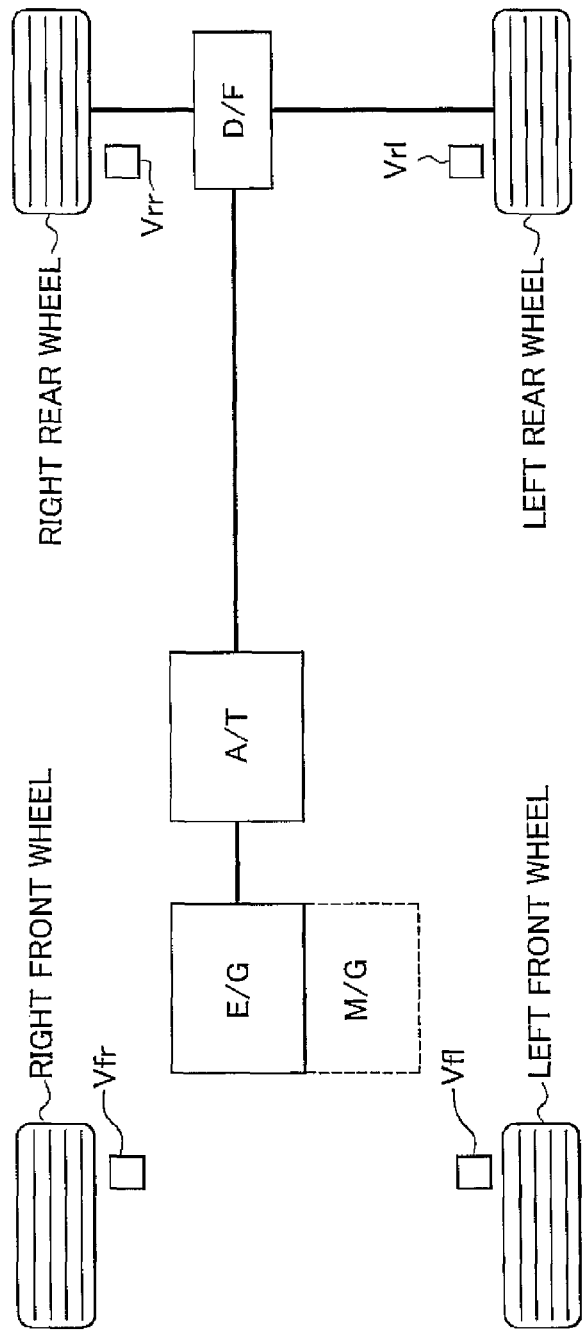
FIG. 1 illustrates a driving system of a vehicle that is equipped with a rotational fluctuation malfunction detection device for an internal combustion engine according to an embodiment of the present invention.
Figure 3:
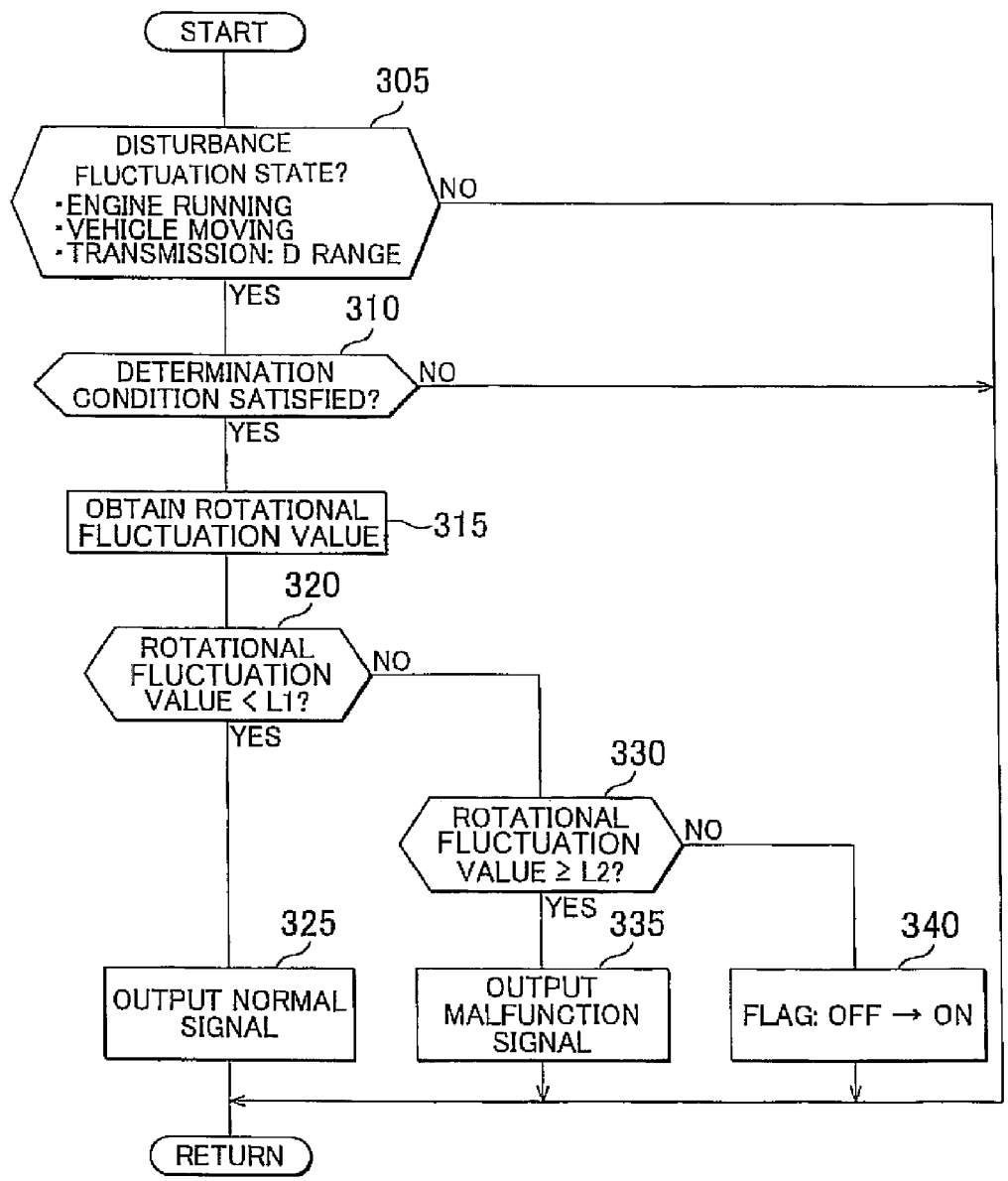
FIG. 3 is a flowchart showing the routine that is executed by a CPU shown in FIG. 2 in detecting malfunctions of rotational speed fluctuation based on the rotational fluctuation value obtained when the vehicle is in a disturbance fluctuation state.

The routine shown in FIG. 3 is executed by the CPU 71 periodically at predetermined intervals (for example 8 milliseconds). First, in step 305, it is determined whether the vehicle is in the "disturbance fluctuation state." If the determination is "no," the routine ends immediately. In this example, "disturbance fluctuation state" indicates the state in which the internal combustion engine E/G is running, the vehicle is moving, and the transmission A/T is in the "D range." Here, the expression "the vehicle is moving" indicates the state in which the vehicle speed detected by wheel speed sensors Vfr, Vfl, Vrr, Vrl shown in FIG. 1 is higher than "0."

If it is determined in step 305 that the vehicle is in a "disturbance fluctuation state" (i.e. "yes" in step 305), the determination is made in step 310 whether the determination conditions are satisfied. If the determination in step 305 is "no," the routine ends immediately. In the "disturbance fluctuation state", the determination conditions are satisfied for example when the internal combustion engine E/G is fully warmed up, the internal combustion engine E/G is in a regular operation state, and a predetermined time has elapsed since the completion of the previous determination process. The regular operation state indicates, for example, that the engine rotational speed NE and the intake air amount equivalent value KL fall within certain values. The intake air amount equivalent value KL is equivalent to the air amount taken into the cylinder in an intake stroke, and may be calculated based on the information obtained from an intake air flow Ga detected by the air flow meter 61 and based on the information obtained from the above-mentioned various sensors.

If the determination conditions are satisfied ("yes" in step 310), a rotational fluctuation value is obtained when the vehicle is in the "disturbance fluctuation state" in step 315. The rotational fluctuation value obtained in step 315 includes, a value obtained based on the difference between cylinders with respect to the "time required for the crank angle to advance a specified angle (for example 30°) from the top dead center," and a value obtained based on the difference between cylinders with respect to the "value equivalent to the differential value of engine rotational speed NE at the top dead center with respect to time." The rotational fluctuation value increases when the degree of non-uniformity of the fluctuation of the engine rotational speed NE increases. That is, the rotational fluctuation value increases as the degree of lean imbalanced state increases (when the deficiency in the amount of fuel injected into the lean imbalanced cylinder increases).

Figure 4:
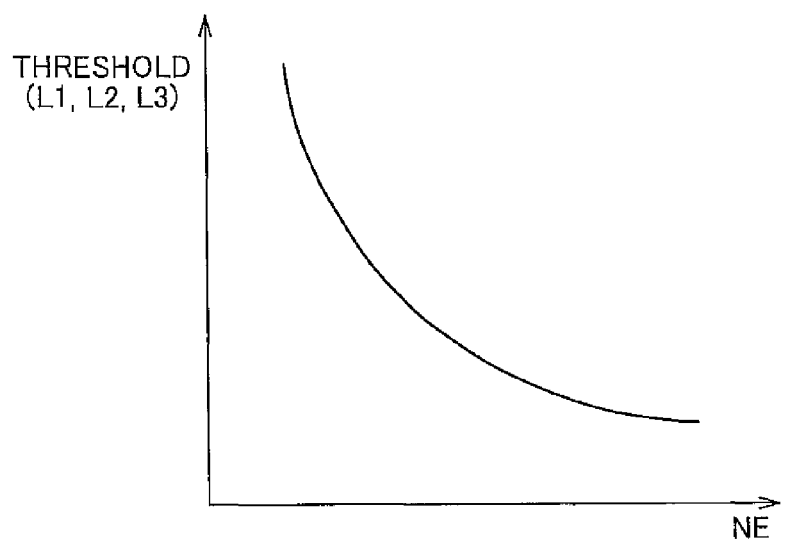
FIG. 4 is a graph that the CPU shown in FIG. 2 refers to and shows the relationship between the engine rotational speed and a malfunction determination threshold.
Figure 5:
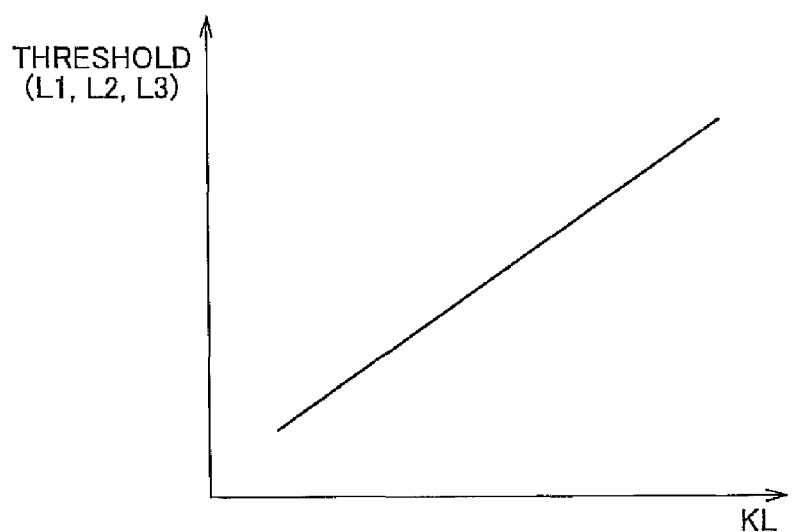
FIG. 5 is a graph that the CPU shown in FIG. 2 refers to and the graph shows the relationship between the in-cylinder intake air amount equivalent value and the malfunction determination threshold.

In step 320, it is determined whether the rotational fluctuation value is below a threshold L1 (also referred to as first threshold value). For example, if the rotational fluctuation value is based on the difference between cylinders with respect to the time required for the crank angle to advance a specified angle from the top dead center, the threshold L1, as shown in FIG. 4 and FIG. 5, is lowered as the engine rotational speed NE increases, and is raised as the intake air amount equivalent value KL increases. It is based on the fact that the rotational fluctuation value decreases as the engine rotational speed NE increases and that the rotational fluctuation value increases as the intake air amount equivalent value KL increases.

If the determination is "yes" in step 320 (rotational fluctuation value<L1), the process proceeds to step 325 in which a "normal signal" that indicates the lean imbalanced state is "normal" is output to the signal output section SO. However, if it is the determination is "no" in step 320, the process proceeds to step 330 in which it is determined whether the rotational fluctuation value is equal to or exceeds the threshold L2 (also referred to as second threshold value), which is higher than the threshold L1. The threshold L2, for the same reason as the threshold L1, may be lowered as the engine rotational speed NE increases, and raised as the intake air amount equivalent value KL increases (refer to FIG. 4 and FIG. 5).

If the determination is "yes" in step 330 (rotational fluctuation value≥L2), the process proceeds to the step 335 in which a "malfunction signal" that indicates the lean imbalanced state "malfunctions" is output to the signal output section SO. However, if is the determination is "no" in step 330 (L1≤rotational fluctuation value<L2), a flag is changed from an "off" state to an "on" state in Step 340. As described later, if the flag is "off", it indicates that the determination process is not conducted in the "non-disturbance fluctuation state," and when the determination is "on", it indicates that the determination process is conducted in the "non-disturbance fluctuation state."

The routine shown in FIG. 6 is repeatedly executed, by the CPU 71, after the routine of FIG. 3. First, in step 605, the determination is made whether the flag is "on". If it is determined that the flag is not on "no", the routine ends immediately. If the flag is "on" ("yes" in step 605), the process proceeds to step 610 in which it is determined whether the vehicle is in a "non-disturbance fluctuation state A." If it is determined that the vehicle is not in a "non-disturbance fluctuation state A" ("no" in step 610), the routine ends immediately. In this example, "non-disturbance fluctuation state A" indicates that the internal combustion engine E/G is running and the vehicle is stopped. Here, the expression "the vehicle is stopped" indicates the state in which the vehicle speed obtained by the wheel speed sensors Vfr, Vfl, Vrr, Vrl shown in FIG. 1 is "0." In the "non-disturbance fluctuation state A", the transmission A/T may be either in the "D range" or in the "N range."

At this point (when the vehicle is stopped), if the conditions for stopping the operation of the internal combustion engine E/G are satisfied, stopping the operation of the internal combustion engine E/G is prohibited and the operation of the internal combustion engine E/G is continued. Accordingly, "non-disturbance fluctuation state A" is ensured.

If the determination in step 610 is that the vehicle is in a "non-disturbance fluctuation state A" ("yes" in step 610), it is determined in step 615 whether the determination conditions are satisfied. If the determination is "no," the routine ends immediately. In the "non-disturbance fluctuation state A," the determination conditions may be satisfied, for example, when the internal combustion engine E/G is fully warmed up, the internal combustion engine E/G is normally running, and a predetermined time period has elapsed since the completion of the previous determination process.

If the determination conditions are satisfied ("yes" in step 615), a rotational fluctuation value is obtained in the "non-disturbance fluctuation state A" in step 620. The rotational fluctuation value may be obtained either by the same calculation method as the step 315 or by the different calculation method.

In step 625, it is determined whether the rotational fluctuation value is below a threshold L3 (also referred to as third threshold value). The threshold L3, for the same reason as the threshold L1, may be lowered as the engine rotational speed NE increases, and raised as the intake air amount equivalent value KL increases (refer to FIG. 4 and FIG. 5). If the rotational fluctuation value is obtained using the same calculation method in step 315 and step 620, the relationship L1<L3<L2 is established as long as the internal combustion engine E/G is operated under the same conditions.

If the determination is "yes" in step 625 (rotational fluctuation value<L3), the process proceeds to step 630 in which a "normal signal" that indicates that the lean imbalanced state is "normal" is output to the signal output section SO. In contrast, if the determination is "no" in step 625 (rotational fluctuation value≥L3), process proceeds to the step 635 in which an "malfunction signal" that indicates the lean imbalanced state is "abnormal" is output to the signal output section SO.

As described above, the detection device performs the following process. (1) If the rotational fluctuation value obtained in the "disturbance fluctuation state" is below L1, it is determined that the lean imbalanced state is "normal." That is, the above-described determination process is performed and completed based on the rotational fluctuation value obtained in the "disturbance fluctuation state." (2) If the rotational fluctuation value obtained in the "disturbance fluctuation state" is equal to or exceeds L2, it is determined that the lean imbalanced state is "abnormal." That is, the above-described determination process is performed and completed based on the rotational fluctuation value obtained in the "disturbance fluctuation state." (3) If the rotational fluctuation value obtained in the "disturbance fluctuation state" is greater than L1, but less than L2, and if the rotational fluctuation value obtained in the "disturbance fluctuation state A" is below L3, it is determined that the lean imbalanced state is "normal." If the rotational fluctuation value obtained in the "non-disturbance fluctuation state A" is equal to or exceeds L3, it is determined that the lean imbalanced state is "abnormal." That is, the above-described determination process is performed and completed based on the rotational fluctuation value obtained in the "non-disturbance fluctuation state A" instead of the rotational fluctuation value obtained in the "disturbance fluctuation state."

Hereinafter, the function and effect obtained by such process will be explained below. In the "non-disturbance fluctuation state A," the engine rotational speed NE is not varied (affected) by disturbances from the driving wheel. The rotational fluctuation value obtained in the "non-disturbance fluctuation state A" precisely shows the degree of non-uniformity of the fluctuation in the engine rotational speed NE, which results from the lean imbalanced state. However, in the "non-disturbance fluctuation state," the engine rotational speed NE is affected by the disturbances from the driving wheel. Therefore, the rotational fluctuation value obtained in the "disturbance fluctuation state" is more easily increased or decreased due to the disturbances from the driving wheel. That is, the rotational fluctuation value obtained in the "rotational fluctuation state" does not always precisely show the degree of non-uniformity of the fluctuation of the engine rotational speed NE caused by the lean imbalanced state.

Accordingly, it is preferable to obtain the rotational fluctuation value in the "non-disturbance fluctuation state A." However, because the vehicle, in which the detection device is used, is provided with an idle stop function, opportunities to obtain the "non-disturbance state A" (when the vehicle is stopped and the internal combustion engine is running) are very rare. According to the detection device, the rotational fluctuation value is obtained also in the "disturbance fluctuation state" that occurs frequently (when the vehicle is moving, the internal combustion engine is running, and the transmission is in the D range).

The process of (1) described above is based on the following reasons. When the rotational fluctuation value obtained in the "disturbance fluctuation state" is below L1, the lean imbalanced state may be precisely determined as "normal" based on the rotational fluctuation value by suitably setting L1 to a value which is small enough even when the effect of the disturbances from the driving wheel is taken into consideration (specifically, when the rotational fluctuation value is reduced by the disturbances from the driving wheel).

The process of (2) described above is based on the following reasons. When the rotational fluctuation value obtained in the "disturbance fluctuation state" is exceeds L2, the lean imbalanced state is precisely determined as "malfunction" based on the rotational fluctuation value, by suitably setting L2 to the value which is large enough even when the effect of the disturbances from the driving wheel is taken into consideration (specifically, when the rotational fluctuation value is reduced by the disturbances from the driving wheel).

The process of (3) described above is based on the following reasons. In the case of (3), the rotational fluctuation value obtained in the "disturbance fluctuation state" is not either sufficiently large or sufficiently small, that is between L1 and L2. If the effect of the disturbances from the driving wheel is taken into consideration, the lean imbalanced state cannot be determined precisely if it is "normal" or "abnormal." In this case, the lean imbalanced state is precisely determined if it is "normal" or "abnormal" based on the rotational fluctuation value obtained in the "non-disturbance fluctuation state A" instead of the "disturbance fluctuation state." If the idle stop function is executed when the vehicle is stopped, the operation of the internal combustion engine E/G continues because stopping of the internal combustion engine E/G is prohibited. Accordingly, "non-disturbance fluctuation state A" is ensured.

According to the above device, in a vehicle that is provided with an idle stop function in which "non-disturbance fluctuation state A" is hardly ensured, opportunities to precisely determine the presence or absence of the "malfunction" of the lean imbalanced state are ensured. Therefore, opportunities to determine the presence or absence of the "malfunction" of the lean imbalanced state are sufficiently ensured, and the "malfunction" is detected precisely.

The above-described situation (3) occurs in the detection device. In consideration of this, the function of the detection device is explained in the following way. The signal that indicates the presence or absence of the "malfunction" of the lean imbalanced state is output based on the rotational fluctuation value obtained in the "disturbance fluctuation state." The signal that indicates whether an "malfunction" of the lean imbalanced state is output based on the rotational fluctuation value obtained in the "non-disturbance fluctuation state A." Depending on the degree of the lean imbalanced state in the internal combustion engine E/G (the degree of insufficiency of the fuel injection amount into the lean imbalanced cylinder), the signal that indicates the presence or absence of the "malfunction" of the lean imbalanced state is not output in the "disturbance fluctuation state," but can be output in the "non-disturbance fluctuation state."

Figure 7:
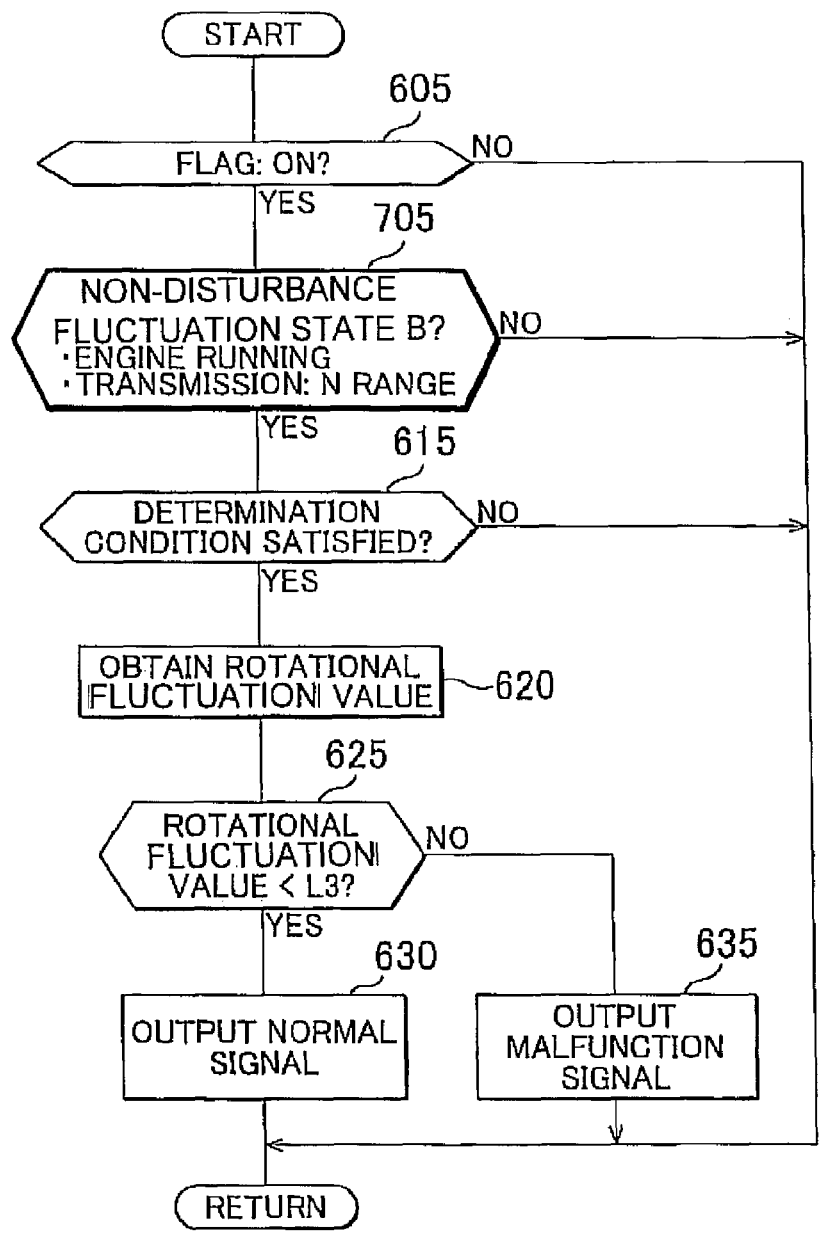
FIG. 7 is a flowchart showing a routine that corresponds to the routine of FIG. 6, and is executed by the CPU of a modified embodiment of the rotational fluctuation malfunction detection device for the internal combustion engine.

The present invention is not restricted to the above-described embodiments, and various modifications can be employed within the scope of the present invention. In the above-described embodiment, "non-disturbance fluctuation state A" is used as the "non-disturbance fluctuation state" (when the vehicle is stopped and the internal combustion engine is running). However, as shown in step 705 of FIG. 7 corresponding to FIG. 6, "non-disturbance fluctuation state B" may also be used as the "non-disturbance fluctuation state." The "non-disturbance fluctuation state B" indicates the state in which the internal combustion engine E/G is running and the transmission A/T is in the "N range."

Preferably, the vehicle is stopped in the "non-disturbance fluctuation state B." However, the vehicle may be moving, if the vehicle has a driveline in which the engine rotational speed NE is not affected by the disturbances from the driving wheel while the transmission A/T is in the "N range." When the vehicle is stopped, stopping the operation of the internal combustion engine E/G is prohibited and so that the engine continues to operate under the conditions that the idle stop function is established. Accordingly, the "non-disturbance fluctuation state B" is ensured. In this way, the same function and effect are produced even if the "non-disturbance fluctuation state B" is used, in stead of the "non-disturbance fluctuation state A," as the "non-disturbance fluctuation state."

Figure 8:
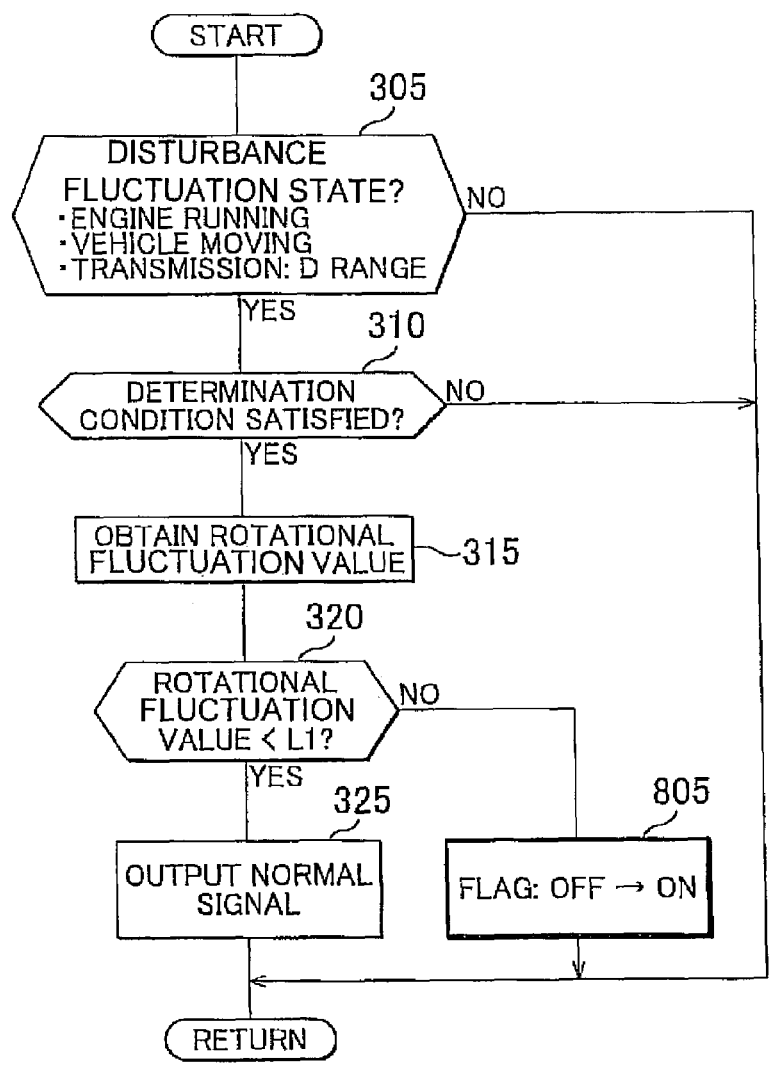
FIG. 8 is a flowchart showing a routine that corresponds to the routine of FIG. 3, and is executed by the CPU of a modified embodiment of the rotational fluctuation malfunction detection device of the internal combustion engine.

As shown in step 805 of FIG. 8 corresponding to FIG. 3, if the rotational fluctuation value obtained in the "disturbance fluctuation state" is not sufficiently small (L1 or larger), the lean imbalanced state may be determined as "abnormal" or "normal" based on the rotational fluctuation value obtained in the "non-disturbance state" instead of the "disturbance fluctuation state" without a comparison between the rotational fluctuation value and L2.

In the above embodiment, the malfunction of the lean imbalanced state is detected based on the rotational fluctuation value. However, malfunctions in a torsional damper, which is interposed between the output shaft of the internal combustion engine E/G and the input shaft of the transmission A/T, or on the misfire in a specific cylinder based on the rotational fluctuation value may instead be used as bases for detecting malfunctions.

While the invention has been described with reference to example embodiments thereof, it is to be understood that the invention is not limited to the example described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A rotational fluctuation malfunction detection device for an internal combustion engine that serves as a power source for a vehicle, the rotational fluctuation malfunction detection device, comprising:
    a parameter obtaining device that is configured to obtain a value of a fluctuation parameter that indicates a degree of non-uniformity in fluctuation of rotational speed of an output shaft of the internal combustion engine;
    an automatic engine stop device that is configured to stop the internal combustion engine when an engine stop condition including that the vehicle is stopped is satisfied; and
    a signal output device that is configured to output a signal that indicates a determination result of whether the degree of non-uniformity of fluctuation of the rotational speed is normal or not based on the value of the fluctuation parameter obtained in the operation of the internal combustion engine,
    wherein if the value of the fluctuation parameter obtained during a disturbance fluctuation state, in which the rotational speed of the output shaft of the internal combustion engine fluctuates due to disturbances from a driving wheel, is below a first threshold value, the signal output device outputs a signal that indicates the determination result based on the value of the fluctuation parameter obtained in the disturbance fluctuation state, and
    if the value of the fluctuation parameter obtained in the disturbance fluctuation state equals or exceeds the first threshold value, the signal output device outputs a signal that indicates the determination results based on the value of the fluctuation parameter obtained in a non-disturbance fluctuation state, in which rotational speed of the output shaft of the internal combustion engine does not fluctuate as a result of disturbances from the driving wheel of the vehicle, instead of the value of the fluctuation parameter obtained in the disturbance fluctuation state.

2. The rotational fluctuation malfunction detection device for an internal combustion engine according to claim 1, further comprising:
    a transmission disposed in a driveline between the output shaft of the internal combustion engine and the driving wheel, wherein
    the disturbance fluctuation state is established when the internal combustion engine is running, the vehicle is moving, and the transmission is transmitting torque between the output shaft of the internal combustion engine and the driving wheel,
    the non-disturbance fluctuation state is established when the internal combustion engine is running and the vehicle is stopped.

3. The rotational fluctuation malfunction detection device for an internal combustion engine according to claim 2, wherein if the vehicle is stopped and the engine stop condition is satisfied, the signal output device prohibits the automatic engine stop device from stopping operation of the internal combustion engine and continues operation of the internal combustion engine so as to maintain the non-disturbance fluctuation state.

4. The rotational fluctuation malfunction detection device for an internal combustion engine according to claim 2, wherein
    if the fluctuation parameter value obtained in the disturbance fluctuation state is below the first threshold value, the signal output device outputs a signal that indicates the degree of non-uniformity of fluctuation in the output shaft rotational speed is normal,
    if the fluctuation parameter value obtained in the disturbance fluctuation state equals or exceeds a second threshold value, which is greater than the first threshold value, the signal output device outputs a signal that indicates the degree of non-uniformity of fluctuation in the output shaft rotational speed is abnormal, and
    if the value of the fluctuation parameter obtained in the disturbance fluctuation state is equal to the first threshold value or between the first threshold value and the second threshold value, the signal output device outputs a signal that indicates the degree of non-uniformity of fluctuation in the output shaft rotational speed is normal if the value of the fluctuation parameter obtained in the non-disturbance fluctuation state is below a third threshold value, and outputs a signal that indicates the degree of non-uniformity of fluctuation in the output shaft rotational speed is abnormal if the value of the fluctuation parameter obtained in the non-disturbance state equals or exceeds the third threshold value.

5. The rotational fluctuation malfunction detection device for an internal combustion engine according to claim 1, further comprising:
    a transmission disposed in a driveline between the output shaft of the internal combustion engine and the driving wheel, wherein
    the disturbance fluctuation state is established when the internal combustion engine is running, the vehicle is moving, and the transmission is transmitting torque between the output shaft of the internal combustion engine and the driving wheel, and
    the non-disturbance fluctuation state is established when the internal combustion engine is running and the transmission is not transmitting torque between the output shaft of the internal combustion engine and the driving wheel.

6. The rotational fluctuation malfunction detection device for an internal combustion engine according to claim 5, wherein
    if the fluctuation parameter value obtained in the disturbance fluctuation state is below the first threshold value, the signal output device outputs a signal that indicates the degree of non-uniformity of fluctuation in the output shaft rotational speed is normal,
    if the value of the fluctuation parameter obtained in the disturbance fluctuation state equals or exceeds a second threshold value, which is greater than the first threshold value, the signal output device outputs the signal that indicates the degree of non-uniformity of fluctuation in the output shaft rotational speed is abnormal, and
    if the fluctuation parameter value obtained in the disturbance fluctuation state is equal to the first threshold value or between the first threshold value and the second threshold value, the signal output device outputs a signal that indicates the degree of non-uniformity of fluctuation in the output shaft rotational speed is normal if the value of the fluctuation parameter obtained in the non-disturbance fluctuation state is below a third threshold value, and outputs a signal that indicates the degree of non-uniformity of fluctuation in the output shaft rotational speed is abnormal if the value of the fluctuation parameter obtained in the non-disturbance state equals or exceeds the third threshold value.

7. The rotational fluctuation malfunction detection device for an internal combustion engine according to claim 1,
wherein the fluctuation parameter is a rotational fluctuation value of the internal combustion engine, and wherein the first threshold value is reduced as rotational speed of the internal combustion engine increases and increased as an intake air amount equivalent value increases.

8. The rotational fluctuation malfunction detection device for an internal combustion engine according to claim 1,
wherein if the fluctuation parameter value obtained in the disturbance fluctuation state is below the first threshold value, the signal output device outputs the signal that indicates the degree of non-uniformity of fluctuation of the rotational speed is normal,
when the value of the fluctuation parameter obtained in the disturbance fluctuation state is a second threshold value or more which is larger than the first threshold value, the signal output device outputs a signal that indicates the degree of non-uniformity of fluctuation in the output shaft rotational speed is abnormal, and
if the value of the fluctuation parameter value obtained in the disturbance fluctuation state is equal to the first threshold value or between the first threshold value and the second threshold value, the signal output device outputs a signal that indicates the degree of non-uniformity of fluctuation in the output shaft rotational speed is normal if the value of the fluctuation parameter obtained in the non-disturbance fluctuation state is below a third threshold value, and outputs a signal that indicates the degree of non-uniformity of fluctuation in the output shaft rotational speed is abnormal if the value of the fluctuation parameter obtained in the non-disturbance state equals or exceeds the third threshold value.

9. The rotational fluctuation malfunction detection device for an internal combustion engine according to claim 8,
wherein the fluctuation parameter is the rotational fluctuation value of the internal combustion engine, and wherein the second threshold value is reduced as the rotational speed of the internal combustion engine increases and increased as the intake air amount equivalent value increases.

10. The rotational fluctuation malfunction detection device for an internal combustion engine according to claim 8,
wherein the fluctuation parameter is the rotational fluctuation value of the internal combustion engine, and wherein the third threshold value is reduced as the rotational speed of the internal combustion engine increases and increased as the intake air amount equivalent value increases.

11. A rotational fluctuation malfunction detection device for an internal combustion engine that serves as a power source for a vehicle, the rotational fluctuation malfunction detection device comprising:
a parameter obtaining device that is configured to obtain the value of fluctuation parameter that indicates the degree of non-uniformity of fluctuation in rotational speed of an output shaft of the internal combustion engine;
an automatic engine stop device that is configured to stop the internal combustion engine when an engine stop condition including that the vehicle is stopped is satisfied; and
a signal output device that is configured to output a signal that indicates a determination result of whether the degree of non-uniformity of fluctuation of the rotational speed is normal based on the value of the fluctuation parameter obtained by the parameter obtaining device when the engine is in operation,
wherein the signal output device outputs a signal that indicates the determination result based on the value of the fluctuation parameter obtained in at least one of disturbance fluctuation states in which the rotational speed of the output shaft of the internal combustion engine fluctuates as a result of disturbances from a driving wheel of the vehicle to which driving torque of the output shaft of the internal combustion engine is transmitted, and also outputs the signal that indicates the determination result based on the fluctuation parameter value obtained in a non-disturbance state in which the rotational speed of the output shaft of the internal combustion engine does not fluctuate as a result of disturbances from the driving wheel of the vehicle, and
when the internal combustion engine is in a lean imbalanced state in which a fuel injection valve for a part of a plurality of cylinders sprays a smaller amount of fuel than specified, the signal output device does not output the signal that indicates the determination result in the disturbance fluctuation state but does output the signal that indicates the determination result in the non-disturbance state.

12. A method of detecting rotational fluctuation malfunctions in an internal combustion engine that serves as a power source for a vehicle, the method comprising:
obtaining the value of fluctuation parameter that indicates the degree of non-uniformity of fluctuation in rotational speed of an output shaft of the internal combustion engine;
outputting a signal that indicates a determination result of whether the degree of non-uniformity of fluctuation of the rotational speed is abnormal based on the value of the fluctuation parameter obtained during a disturbance fluctuation state, in which disturbances from a driving wheel, to which driving torque of the output shaft of the internal combustion engine is transmitted, cause fluctuations in the rotational speed of the output shaft of the internal combustion engine, and a non-disturbance state, in which disturbances from the driving wheel do not cause fluctuations in the rotational speed of the output shaft, wherein
the determination result is based on the fluctuation parameter value obtained during the disturbance fluctuation state if the fluctuation parameter value obtained in the disturbance fluctuation state is below a first threshold value, and
the determination result is based on the fluctuation parameter value obtained during the disturbance fluctuation state if the fluctuation parameter value obtained in the non-disturbance fluctuation state if the fluctuation parameter value obtained in the disturbance fluctuation state equals or exceeds the first threshold value.

13. A method of detecting rotational fluctuation malfunctions in an internal combustion engine that serves as a power source for a vehicle, comprising:

obtaining the value of fluctuation parameter that indicates the degree of non-uniformity of fluctuation in rotational speed of an output shaft of an internal combustion engine;

outputting a signal that indicates a determination result of whether the degree of non-uniformity of fluctuation of the rotational speed is abnormal based on the value of the fluctuation parameter obtained during at least one of a disturbance fluctuation state, in which disturbances from a driving wheel, to which driving torque of the output shaft of the internal combustion engine is transmitted, cause fluctuations in the rotational speed of the output shaft, and a non-disturbance state, in which disturbances from the driving wheel, to which driving torque of the output shaft of the internal combustion engine is transmitted, does not cause fluctuations in the rotational speed of the output shaft, from a signal output device, wherein the signal that indicates the determination result based on the fluctuation parameter value obtained during the non-disturbance state if the internal combustion engine is in a lean imbalanced state, in which a fuel injection amount injected by at least one fuel injection valve is below a target fuel injection amount.

* * * * *